US011069254B2

(12) United States Patent
Lechner

(10) Patent No.: US 11,069,254 B2
(45) Date of Patent: Jul. 20, 2021

(54) METHOD FOR SIMULATING LIVE AIRCRAFT INFRARED SEEKER OBSCURATION DURING LIVE, VIRTUAL, CONSTRUCTIVE (LVC) EXERCISES

(71) Applicant: The Boeing Company, Chicago, IL (US)

(72) Inventor: Robert James Lechner, Hazelwood, MO (US)

(73) Assignee: The Boeing Company, Chicago, IL (US)

( * ) Notice: Subject to any disclaimer, the term of this patent is extended or adjusted under 35 U.S.C. 154(b) by 662 days.

(21) Appl. No.: 15/479,944

(22) Filed: Apr. 5, 2017

(65) Prior Publication Data

US 2018/0293909 A1 Oct. 11, 2018

(51) Int. Cl.
*G09B 9/16* (2006.01)
*G09B 9/00* (2006.01)
(Continued)

(52) U.S. Cl.
CPC ............ *G09B 9/003* (2013.01); *F41G 7/004* (2013.01); *F41G 7/006* (2013.01); *G09B 9/006* (2013.01);
(Continued)

(58) Field of Classification Search
CPC . G09B 9/02; G09B 9/04; G09B 9/003; G09B 9/006; G09B 9/16; G09B 9/36;
(Continued)

(56) References Cited

U.S. PATENT DOCUMENTS 4,280,285 A 7/1981 Haas
4,442,491 A 4/1984 Olhausen, Jr.
(Continued)

FOREIGN PATENT DOCUMENTS

JP H08276074 A 10/1996
WO WO2012082242 A2 6/2012

OTHER PUBLICATIONS

Lechner et al., "Integrated Live Constructive Technologies Applied to Tactical Aviation Training," Proceedings of the Interservice/Industry Training, Simulation, and Education Conference (I/ITSEC), Nov. 2008, 11 pages.
(Continued)

*Primary Examiner* — Bruk A Gebremichael
(74) *Attorney, Agent, or Firm* — Yee & Associates, P.C.

(57) ABSTRACT

The illustrative embodiments provide for a method a training system. The training system includes a physical sensor system connected to a physical vehicle. The physical sensor system is configured to obtain real atmospheric obscuration data of a real atmospheric obscuration. The training system also includes a data processing system comprising a processor and a tangible memory. The data processing system is configured to receive the real atmospheric obscuration data, and determine based on the real atmospheric obscuration data whether a target is visible to the physical vehicle in a simulation training environment generated by the data processing system. The simulation training environment at least including a virtual representation of the physical vehicle and a virtual representation of the real atmospheric obscuration.

20 Claims, 10 Drawing Sheets

(51) Int. Cl.
  *G09B 9/36* (2006.01)
  *G09B 9/44* (2006.01)
  *F41G 7/00* (2006.01)

(52) U.S. Cl.
  CPC .............. *G09B 9/16* (2013.01); *G09B 9/36* (2013.01); *G09B 9/44* (2013.01)

(58) Field of Classification Search
  CPC .. G09B 9/44; G09B 9/54; F41G 7/006; F41G 7/008; F41G 7/303; F41G 7/306
  See application file for complete search history.

(56) References Cited

U.S. PATENT DOCUMENTS

| | | | |
|---|---|---|---|
| 4,599,070 A | 7/1986 | Hladky et al. | |
| 5,616,030 A | 4/1997 | Watson | |
| 5,807,109 A | 9/1998 | Tzidon et al. | |
| 6,106,297 A | 8/2000 | Pollak et al. | |
| 6,199,008 B1* | 3/2001 | Aratow | G01C 23/00 701/120 |
| 7,098,913 B1 | 8/2006 | Etherington et al. | |
| 8,170,976 B2 | 5/2012 | Dargue et al. | |
| 8,616,883 B2 | 12/2013 | Wokurka | |
| 8,616,884 B1 | 12/2013 | Lechner et al. | |
| 8,986,011 B1 | 3/2015 | Sowdaski et al. | |
| 9,099,009 B2 | 8/2015 | Sowadski et al. | |
| 9,230,446 B1 | 1/2016 | Mendro et al. | |
| 9,262,939 B2 | 2/2016 | Lechner et al. | |
| 2003/0033059 A1* | 2/2003 | Ebert | H04L 69/08 701/3 |
| 2003/0046396 A1 | 3/2003 | Richter et al. | |
| 2004/0225420 A1* | 11/2004 | Morizet | G01C 23/005 701/3 |
| 2005/0089831 A1 | 4/2005 | Russell, II et al. | |
| 2006/0178758 A1 | 8/2006 | Koriat | |
| 2007/0264617 A1 | 11/2007 | Richardson et al. | |
| 2008/0206719 A1 | 8/2008 | Johnsson et al. | |
| 2010/0013927 A1 | 1/2010 | Nixon | |
| 2010/0113149 A1* | 5/2010 | Suddreth | G01C 23/00 463/31 |
| 2011/0076649 A1 | 3/2011 | Best et al. | |
| 2011/0171611 A1 | 7/2011 | Batcheller et al. | |
| 2011/0313658 A1 | 12/2011 | He | |
| 2012/0156653 A1 | 6/2012 | Wokurka | |
| 2012/0204059 A1 | 8/2012 | Preston | |
| 2014/0080099 A1 | 3/2014 | Sowdaski | |
| 2014/0113255 A1 | 4/2014 | Lechner et al. | |
| 2014/0170601 A1 | 6/2014 | Wokurka et al. | |
| 2014/0322674 A1* | 10/2014 | Livneh | G09B 9/08 434/30 |
| 2015/0135254 A1 | 5/2015 | Thilenius et al. | |
| 2016/0117946 A1 | 4/2016 | Mendro et al. | |
| 2016/0210871 A1 | 7/2016 | Wokurka et al. | |

OTHER PUBLICATIONS

Lechner "Real-Time, In-Flight Simulation of a Target", U.S. Appl. No. 15/095,572, filed Apr. 11, 2016, 26 pages.
Sowadiski et al., "Augmented Reality System for Field Training", U.S. Appl. No. 13/016,014, filed Jan. 28, 2011, 67 pages.
Office Action, dated Apr. 5, 2012, regarding U.S. Appl. No. 12/628,831, 13 pages.
Final Office Action, dated Oct. 25, 2012, regarding U.S. Appl. No. 12/628,831, 11 pages.
Office Action, dated Jun. 6, 2013, regarding U.S. Appl. No. 12/628,831, 9 pages.
Final Office Action, dated Oct. 9, 2014, regarding U.S. Appl. No. 12/628,831, 16 pages.
Office Action, dated Mar. 13, 2015, regarding U.S. Appl. No. 12/628,831, 18 pages.
Notice of Allowance, dated Aug. 28, 2015, regarding U.S. Appl. No. 12/628,831, 13 pages.
Office Action, dated Aug. 30, 2012, regarding U.S. Appl. No. 13/304,504, 12 pages.
Final Office Action, dated Dec. 21, 2012, regarding U.S. Appl. No. 13/304,514, 12 pages.
Notice of Allowance, dated Aug. 23, 2013, regarding U.S. Appl. No. 13/304,514, 10 pages.
Office Action, dated Aug. 30, 2012, regarding U.S. Appl. No. 12/880,701, 13 pages.
Final Office Action, dated Apr. 25, 2013, regarding U.S. Appl. No. 12/880,701, 8 pages.
Office Action, dated Feb. 27, 2014, regarding U.S. Appl. No. 12/880,701, 22 pages.
Final Office Action, dated Aug. 28, 2014, regarding U.S. Appl. No. 12/880,701, 12 pages.
Notice of Allowance, dated Nov. 19, 2014, regarding U.S. Appl. No. 12/880,701, 11 pages.
Office Action, dated Aug. 31, 2012, regarding U.S. Appl. No. 12/968,494, 11 pages.
Final Office Action, dated Apr. 25, 2013, regarding U.S. Appl. No. 12/968,494, 7 pages.
Notice of Allowance, dated Aug. 20, 2013, regarding U.S. Appl. No. 12/968,494, 22 pages.
Office Action, dated May 23, 2014, regarding U.S. Appl. No. 14/141,761, 15 pages.
Final Office Action, dated Jun. 19, 2014, regarding U.S. Appl. No. 14/141,761, 7 pages.
Office Action, dated Nov. 25, 2014, regarding U.S. Appl. No. 14/141,761, 6 pages.
Final Office Action, dated Jun. 19, 2015, regarding U.S. Appl. No. 14/141,761, 24 pages.
Notice of Allowance, dated Sep. 24, 2015, regarding U.S. Appl. No. 14/141,761, 6 pages.
Office Action, dated Nov. 20, 2014, regarding U.S. Appl. No. 14/083,078, 12 pages.
Final Office Action, dated Jan. 16, 2015, regarding U.S. Appl. No. 14/083,078, 9 pages.
Notice of Allowance, dated Apr. 2, 2015, regarding U.S. Appl. No. 14/083,078, 5 pages.
Final Office Action, dated Dec. 20, 2013, regarding U.S. Appl. No. 12/880,701, 8 pages.

* cited by examiner

METHOD FOR SIMULATING LIVE AIRCRAFT INFRARED SEEKER OBSCURATION DURING LIVE, VIRTUAL, CONSTRUCTIVE (LVC) EXERCISES

BACKGROUND INFORMATION

1. Field

The present disclosure relates to a method for simulating live aircraft infrared seeker obscuration during live, virtual, constructive (LVC) exercises. More particularly, the present disclosure relates to a method to perform high fidelity simulated infrared seeker (missile or target pod infrared seeker) target obscuration for live, virtual constructive (LVC) exercises during live flight or vehicle operation.

2. Background

Maintaining a modern military air capability requires constant testing and, for pilots and crew, constant training. One aspect of this testing and training is testing or practicing the firing of missiles at virtual or constructive targets during a live flight of a physical aircraft. A virtual target is a human-controlled simulation representing an entity, for example a friend or foe aircraft, in the training environment. A constructive target is a computer-controlled simulation representing an entity in the training environment.

Because missiles are very expensive, sometimes many millions of dollars for each live missile, simulators are used to simulate an air combat environment, and simulate launch and operation of a missile. Thus, while a pilot is actually flying an aircraft, a simulation is used to simulate gaining a target lock and then firing of a missile at a simulated target.

SUMMARY

The illustrative embodiments provide for a training system. The training system includes a physical sensor system connected to a physical vehicle. The physical sensor system is configured to obtain real atmospheric obscuration data of a real atmospheric obscuration. The training system also includes a data processing system comprising a processor and a tangible memory. The data processing system is configured to receive the real atmospheric obscuration data, and determine based on the real atmospheric obscuration data whether a target is visible to the physical vehicle in a simulation training environment generated by the data processing system. The simulation training environment at least includes a virtual representation of the physical vehicle and a virtual representation of the real atmospheric obscuration.

The illustrative embodiments also provide a method for training. The method includes obtaining real atmospheric obscuration data of a real atmospheric obscuration using a physical sensor system connected to a physical vehicle. The method also includes receiving, at a tangible data processing system, the real atmospheric obscuration data. The method also includes generating, by the tangible data processing system, a simulation training environment including at least a virtual representation of the physical vehicle and a virtual representation of the real atmospheric obscuration. The method also includes determining, by the tangible data processing system, based on the real atmospheric obscuration data, whether a target is visible to the physical vehicle in the simulation training environment.

The illustrative embodiments also provide for a method of simulating targets for a physical aircraft configured with a physical sensor system. The method includes operating the physical aircraft in flight. The method also includes measuring, using the physical sensor system, a real atmospheric obscuration to generate atmospheric obscuration data. The method also includes tracking a target in a virtual environment generated by a processor in communication with the physical aircraft. The method also includes determining, by the processor and based on the atmospheric obscuration data, whether the virtual target is visible to the physical aircraft in the virtual environment. The method also includes displaying the virtual target in the virtual simulation environment only when the target is not obscured by the real atmospheric obscuration. The method also includes only tracking without displaying the target in the virtual environment when the target is obscured by the real atmospheric obscuration.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
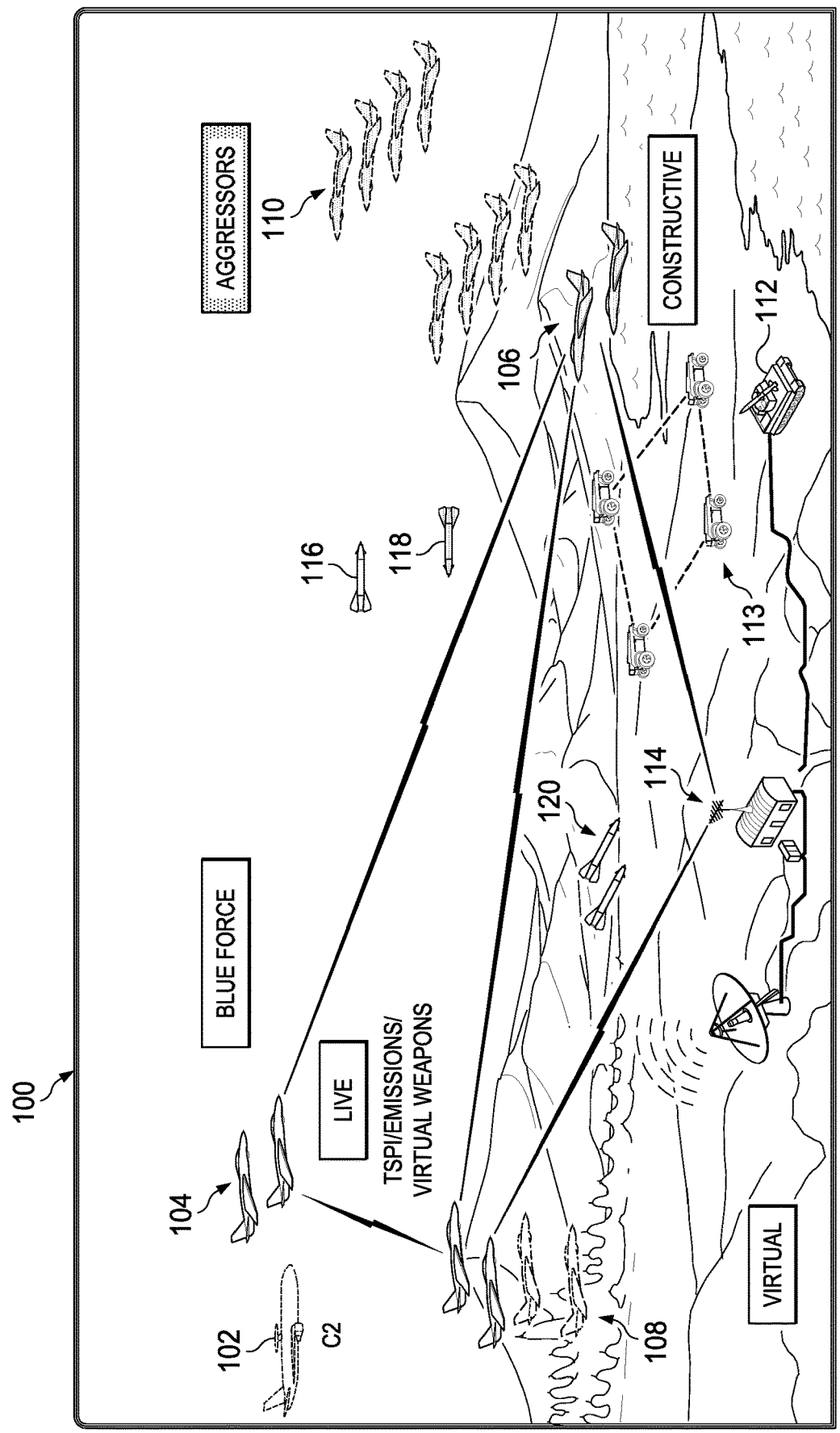
FIG. 1 is an illustration of a representation of a simulated air combat environment during a live flight of a physical aircraft in accordance with an illustrative embodiment.

To be clear, attention is first turned to the context in which the illustrative embodiments operate. The illustrative embodiments contemplate a real pilot flying a real aircraft. A simulator, in the form of a computer, is either brought on board or attached to an external bay or pod of the aircraft.

Thus, the simulator may be added as a post-fabrication installation, or may be part of an integrated design of the aircraft.

Once in the air, the simulator may create a simulation which emulates the real aircraft and the physical environment around the aircraft. Virtual representations of real targets may be generated as part of the simulation. Alternatively, or in addition, purely virtual creations of unreal targets may be generated as part of the simulation.

The simulation is presented to the pilot, via one or more user interfaces, while the pilot is operating the aircraft in flight in real time. The simulation may allow the pilot to engage in a virtual representation of air combat, including but not limited to a simulation of firing missiles (particularly heat seeking missiles) at the simulated targets. However, the real operation of the actual aircraft affects the simulation. In this manner, the pilot could fly the plane in a real maneuver in order to practice maneuvering in view of a simulated missile fired at the pilot's aircraft. These maneuvers would affect what the pilot sees in the simulation.

Thus, the illustrative embodiments recognize and take into account that simulated air combat may be a combination of a virtual environment and real entities and events. The virtual environment is, of course, purely virtual, as only representations of real things are present in the virtual environment. However, the virtual environment takes cues from the real environment, and in addition, the computer operating the virtual environment may add simulated (purely virtual) entities and events to the virtual environment in order to help train the pilot by operating real controls during a real flight, but not actually firing any missiles.

Thus, for example, a pilot could fly a real aircraft with a virtual training system. The pilot pays attention to a simulation being generated during real flight. The simulation presents virtual representations of enemy aircraft (they do not actually threaten the pilot), along with virtual representations of real buildings on the ground that are targets of the simulated operation. The pilot may fly his or her aircraft in real maneuvers based on cues taken from the virtual enemies in the simulation, such as to engage in a dogfight. Because real missiles may cost millions of dollars apiece, the simulator user interface allows the pilot to go through the motions of arming, locking, and firing a missile at a virtual representation of one of the targets. The simulation shows the virtual missile firing, and possibly hitting or missing its virtual target, but no real missile is fired. When training is complete, the pilot can land the aircraft normally.

The illustrative embodiments recognize and take into account that, currently, models exist for simulating air combat, including simulated missile launch, for training purposes. These models allow an aircrew to simulate detecting and tracking live, virtual, and constructive targets in the infrared spectrum. The seeker models provide feedback (such as audio and/or visual cues) to the aircrew during detection and tracking.

Currently such models have no method to interact with real world visual phenomena (e.g. clouds, fog, oil vapor, an infrared heat source such as the sun, or the engine of a non-targeted vehicle) that may obscure the line of sight of the infrared seeking missile to a target. Such visual phenomena may be termed an "atmospheric obscuration" or "atmospheric obscurations".

Atmospheric obscurations are significant in air combat. Taking advantage of atmospheric obscurations is a tactical maneuver that pilots may employ to defeat an enemy, such as by flying in the direction of the sun relative to the enemy's line of sight in order to draw off an infrared seeking missile. A pilot may fly behind a cloud in order to deprive an enemy missile of the ability to seek the heat signature from the aircraft's engine.

One of the several purposes of the illustrative embodiments is to add virtual representations of real atmospheric obscurations to a virtual environment, such as that described above. Another of the several purposes of the illustrative embodiments is to add virtually created atmospheric obscurations to a virtual environment, such as that described above.

For infrared seeking missile simulations, current solutions may rely upon a captive AIM-9 (CATM) to perform live weapon training. A CATM is a no-launch inert weapon simulator that is carried on an aircraft at a weapons station. A simulator could also be installed inside an aircraft. Either way, the simulator could be pre-installed during manufacture, or added later as a modification.

A AIM-9 (CATM) will not provide the necessary missile seeker cues to the aircrew for the virtual, constructive domain. Due to aircraft weapon bus bandwidth limitations, it is unlikely that data can be provided to the AIM-9 (CATM) to support interaction with the virtual/constructive domains. The AIM-9 (CATM) was not designed for such.

With the illustrative embodiments, a AIM-9 (CATM) may not be necessary for weapons training in an LVC exercise. Thus, the illustrative embodiments not only solve the problems with the AIM-9 (CATM), the illustrative embodiments eliminate the associated costs of a AIM-9 (CATM) altogether.

The illustrative embodiments contemplate a novel approach of utilizing a depth sensing visual sensor (e.g. LIDAR) that can detect visual phenomena (such as clouds, fog, oil vapor) that may obscure a heat signature from the infrared seeker. The sensor provides information to the seeker model, indicating when the target is obscured, thus breaking seeker lock or acquisition of the target.

The illustrative embodiments can also detect when the sun is obscured by atmospheric phenomena, thus indicating to the infrared seeker model that target/sun effects (seeker pulloff/break lock) are available or not.

In a similar application, depth map data of the atmosphere created by the depth sensor can be utilized by virtual and constructive simulations to assess visibility of the live aircraft environment. For example, a live aircraft could be obscured by a cloud from a constructive simulation infrared seeker and the infrared seeker would lose lock. In another similar application, an infrared camera could be added to directly measure heat signatures, and then add virtual representations of those heat signatures to the virtual environment and modify simulated infrared seeker behavior accordingly.

Stated differently, the illustrative embodiments contemplate sensor input to a training system to provide actual visual atmospheric conditions for training mission participants to determine true visual capabilities of targets in view of obscuring atmospheric conditions such as clouds, smoke, or sunlight. The position of real, virtual, and constructive targets and aircraft are correlated to obscuring object/events to determine if targets should be visible or not visible to training mission participants (e.g. aircraft).

Thus, the illustrative embodiments recognize and take into account that virtual and constructive targets can be artificially, and incorrectly, visible to training participant aircraft when obscuring events exist in reality. The illustrative embodiments may deal with this issue by having actual sensors systems on aircraft in training missions providing obscuring event data (atmospheric obscuration data) to the training system to determine if targets are visible given the location in the coordinate space of the aircraft, target(s), and obscuring events (such as clouds, sunlight, ect.). The training system determines if non-real targets are projected to actual training mission aircraft participants.

FIG. 1 is an illustration of a representation of a simulated air combat environment during a live flight of a physical aircraft in accordance with an illustrative embodiment. FIG. 1 may be a screenshot of simulation environment 100 presented to a pilot in a live aircraft, such as virtual aircraft 102, real aircraft 104, and real aircraft 106. These real aircraft may belong to the same military organization, but have taken the roles of defenders (blue force) or aggressors (red force).

Simulation environment 100 has a variety of different virtual objects, some of which are real things in the physical world and some of which are entirely virtually created, and some of which are constructive representations of real objects (but modified somehow for purpose of the simulation).

In simulation environment 100, aircraft 104 and aircraft 106 are real. However, aircraft 102, aircraft 108, and aircraft 110 are only virtual or constructive. Vehicles 112 are real, but vehicle 113 is a constructive representation of a real vehicle. Ground station 114, including an antenna and a building, may coordinate the training session and may send signals to any of the real aircraft to modify simulation environment 100.

Simulation environment 100 also includes simulated weapons deployment. Thus, for example, defender missile 116, aggressor missile 118, and bombs 120 are all simulated. In this manner, pilots can train with real weapons systems in real flight under a variety of different conditions without actually deploying real weapons.

Figure 2:
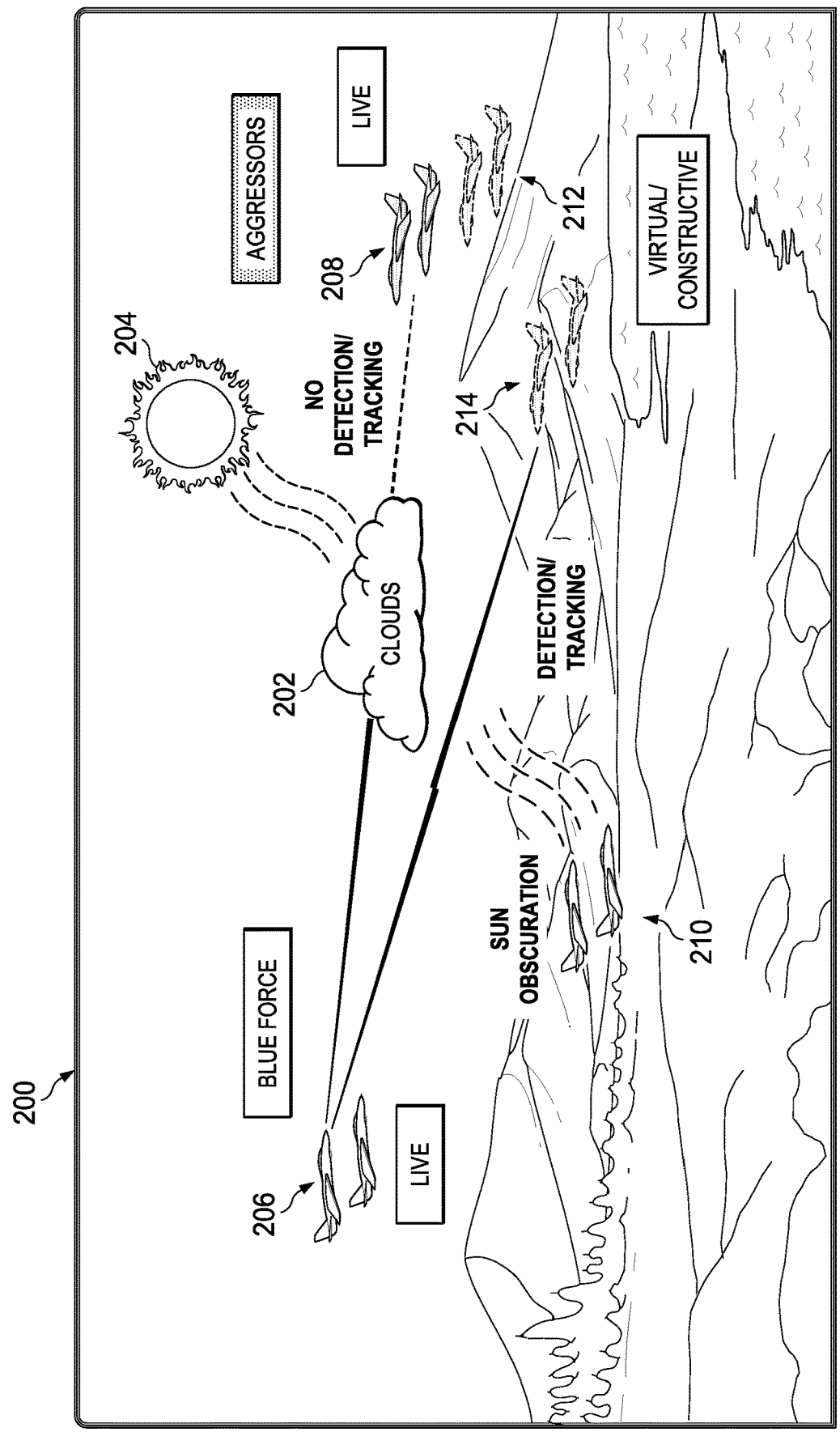
FIG. 2 is an illustration of another representation of a simulated air combat environment during a live flight of a physical aircraft in accordance with an illustrative embodiment.

FIG. 2 is an illustration of another representation of a simulated air combat environment during a live flight of a physical aircraft in accordance with an illustrative embodiment. Simulation environment 200 in FIG. 2 is a variation of simulation environment 100 in FIG. 1. Simulation environment 200 illustrates a potential issue in a combined live training, virtual simulation situation.

In particular, real atmospheric obscuration 202 and real atmospheric obscuration 204 are present in the real environment. In this example, real atmospheric obscuration 202 is clouds and real atmospheric obscuration 204 is the sun. However, atmospheric obscurations can take many forms including, but not limited to, smoke, dust, ash, the Sun itself, other heat sources, or anything else that might interfere with the ability of a heat seeking missile to gain and maintain a lock on a target.

In this example, simulation environment 200 includes a virtual representation of real atmospheric obscuration 202. Simulation environment 200 also includes virtual representations of real aircraft 206 (taking the role of defenders), real aircraft 208 (taking the role of aggressors), and real aircraft 210 (taking the roll of defenders). Aircraft 212 and aircraft 214 are virtual or constructive creations that are taking the role of aggressors.

Again, one issued faced by current combined live/virtual simulation technology is that the real atmospheric obscurations are not represented in simulation environment 200. Such atmospheric obscurations change over time in terms of location and intensity. However, the presence of atmospheric obscurations can certainly affect the performance of a real missile. Thus, to better simulate missile launch, tracking, and impact, virtual representations of real atmospheric obscuration 202 and real atmospheric obscuration 204 should be added to simulation environment 200.

The illustrative embodiments address this issue. In particular, sensors mounted to one or more of real aircraft 206, real aircraft 208, and/or real aircraft 210 take measures of real atmospheric obscuration 202 and real atmospheric obscuration 204. These measurements are then converted into data useful for inclusion by the computer into simulation environment 200. As a result, simulated representations of real atmospheric obscuration 202 and real atmospheric obscuration 204 may be added to simulation environment 200.

Figure 3:
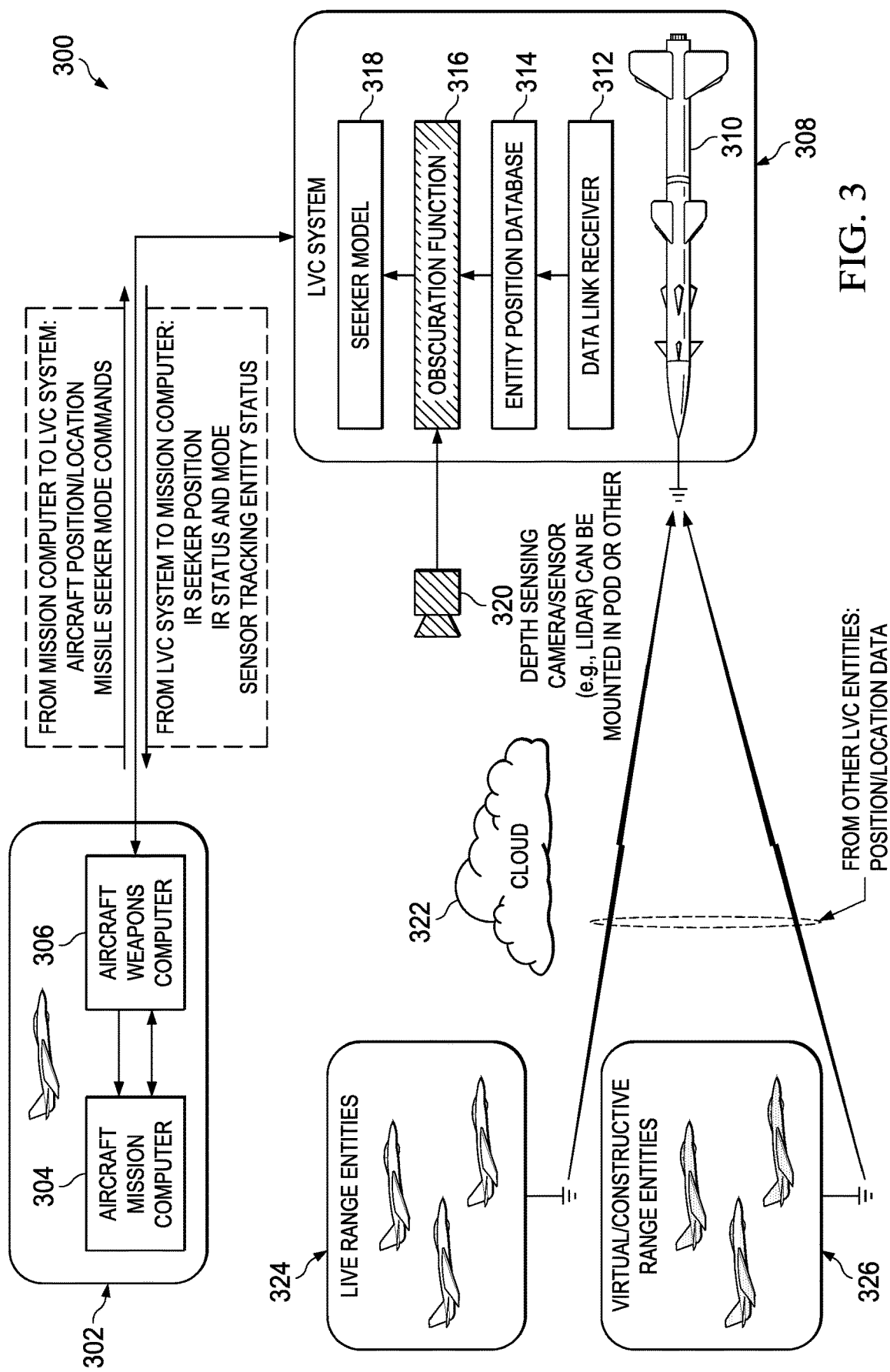
FIG. 3 is an illustration of a distributed air combat training system in accordance with an illustrative embodiment.

FIG. 3 is an illustration of a distributed air combat training system in accordance with an illustrative embodiment. System 300 may be a system that operates in a live training exercise environment, such as those described with respect to FIG. 1 and FIG. 2.

System 300 includes real aircraft 302 and a live, virtual, constructive system (LVC system 308). Real aircraft 302 may include aircraft mission computer 304 and aircraft weapons computer 306, that are in communications with each other. Aircraft mission computer 304 aids the pilot with the mission and may be responsible for presenting a simulated environment to a real pilot who is actually flying real aircraft 302. Aircraft weapons computer 306 may control the weapons system of real aircraft 302.

LVC system 308 may be implemented as a computer in communication with sensors. LVC system 308 may be part of real aircraft 302, or may be part of a ground system which communicates wirelessly with aircraft weapons computer 306 of real aircraft 302. LVC system 308 may be physically mounted to a weapons or training pod of real aircraft 302, may be internal to real aircraft 302, and in either case may have been retrofitted to real aircraft 302 or provided with real aircraft 302 during manufacture.

LVC system 308 includes algorithms and data for simulating launch, tracking, and impact of heat seeking missile 310. Heat seeking missile 310 may instead by a dummy missile used for training purposes, or may be merely the physical housing of the computer system that implements LVC system 308.

Such algorithms and data are operated and manipulated by a computer including one or more processors and one or more non-transitory computer-recordable storage mediums. Such algorithms and data include data link receiver 312 (for sending and receiving data), entity position database 314 (for tracking positions of virtual and representations of real objects in the simulated environment), obscuration function 316 (the subject of the illustrative embodiments), and seeker model 318 (which models the particular heat seeking missile being simulated). The purpose of obscuration function 316 is to convert real measurements of real atmospheric obscurations into virtual representations of those real atmospheric obscurations in the simulated environment created by LVC system 308.

Overall, aircraft mission computer 304 communicates with LVC system 308 regarding the location and position of real aircraft 302. Aircraft weapons computer 306 may provide to LVC system 308 missile seeker mode commands. In return, LVC system 308 may return to aircraft mission computer 304 an infrared seeker position, infrared seeker status and mode, as well as data regarding the status of an entity being tracked (the target).

Attention is now returned to obscuration function 316. Obscuration function 316 is in communication with real sensor 320. Real sensor 320 may be one sensor or may be a suite of sensors. For example, real sensor 320 may be one or more of a light detection and ranging (LIDAR) system, a depth sensing camera, a moisture detector, an infrared camera, or any number of other sensors.

Real sensor 320 may detect an atmospheric obscuration, such as but not limited to cloud 322. Data regarding cloud 322 is transmitted to obscuration function 316 of LVC system 308, which in turn converts this data into a virtual representation of cloud 322 in a simulated environment presented by LVC system 308. For example, a cloud depth map may be used to characterize cloud 322 in the virtual environment. In this manner, the virtual representation of cloud 322 may interfere with missile lock with respect to virtual representations of live range entities 324 (other real aircraft in this example) or virtual/constructive range entities 326 (purely virtual aircraft).

Figure 4:
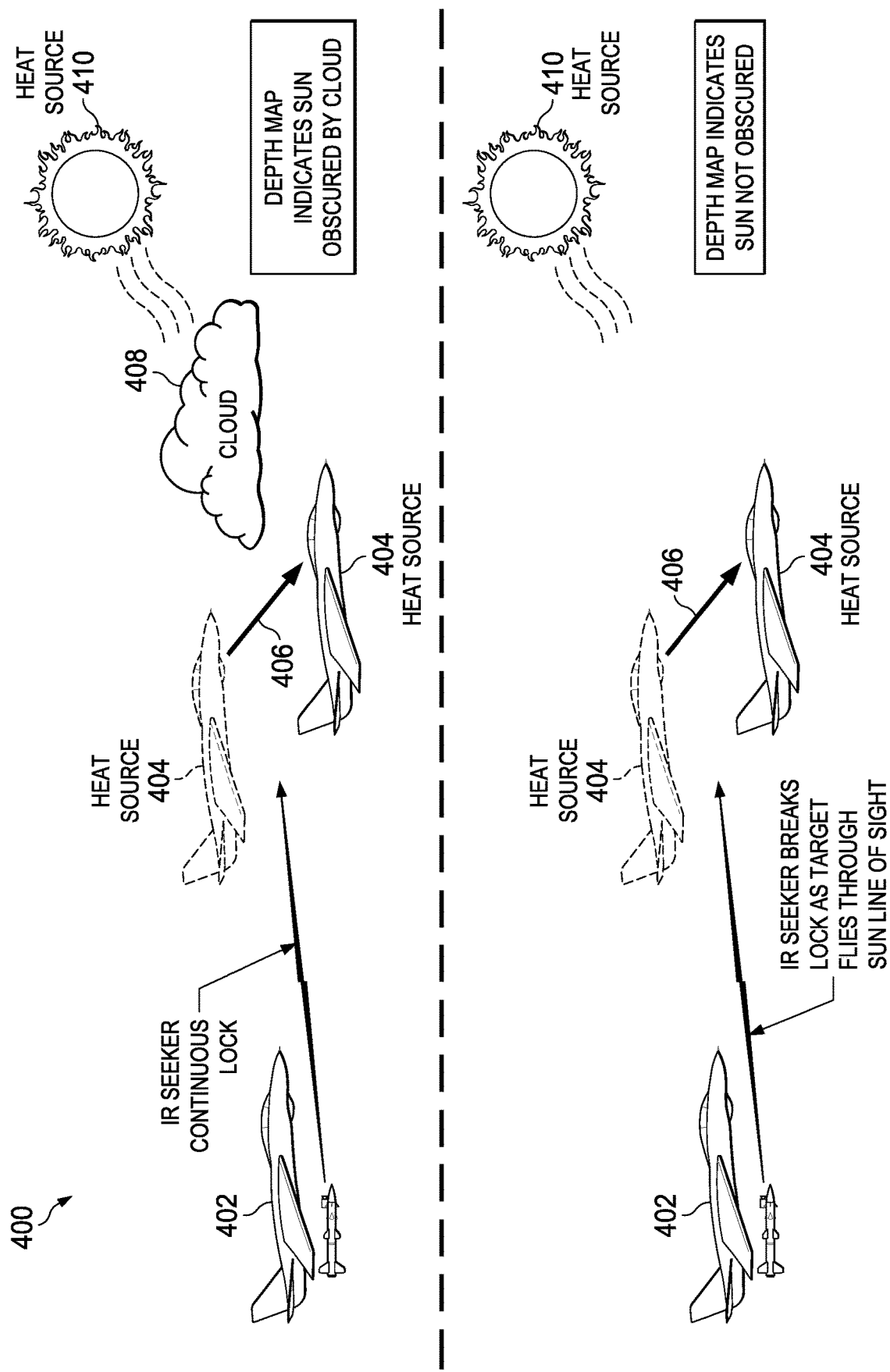
FIG. 4 is an illustration of adding an interaction of real obscuration objects in a simulated training environment during a live flight of a physical aircraft in accordance with an illustrative embodiment.

FIG. 4 is an illustration of adding an interaction of real obscuration objects in a simulated training environment during a live flight of a physical aircraft in accordance with an illustrative embodiment. Simulation environment 400 may be a variation of simulation environment 100 of FIG. 1, simulation environment 200 of FIG. 2, and system 300 of FIG. 3. In FIG. 4, virtual representations of real atmospheric obscurations interact with each other to produce different results in simulation environment 400.

For example, real aircraft 402 is attempting to obtain a missile lock on to target aircraft 404 (which may be a virtual representation of a real aircraft or a purely virtual aircraft). Target aircraft 404 is flying in a direction as indicated by arrow 406. In this example, atmospheric obscuration 408 is a virtual representation of a real cloud and atmospheric obscuration 410 is a virtual representation of the Sun. Note that target aircraft 404 flies in a manner that interposes atmospheric obscuration 408 between target aircraft 404 and atmospheric obscuration 410. In other words, the cloud blocks the view of the Sun relative to real aircraft 402. As a result, the computer indicates that the infrared seeking missile has a lock on to target aircraft 404.

However, if cloud were not properly represented in simulated environment 400, the Sun is not obscured by the cloud. As a result, the computer would indicate that the infrared seeking missile no longer has a lock on to target aircraft 404. The reason is that the heat radiating from the Sun masks the heat radiating from the engines of target aircraft 404.

Figure 5:
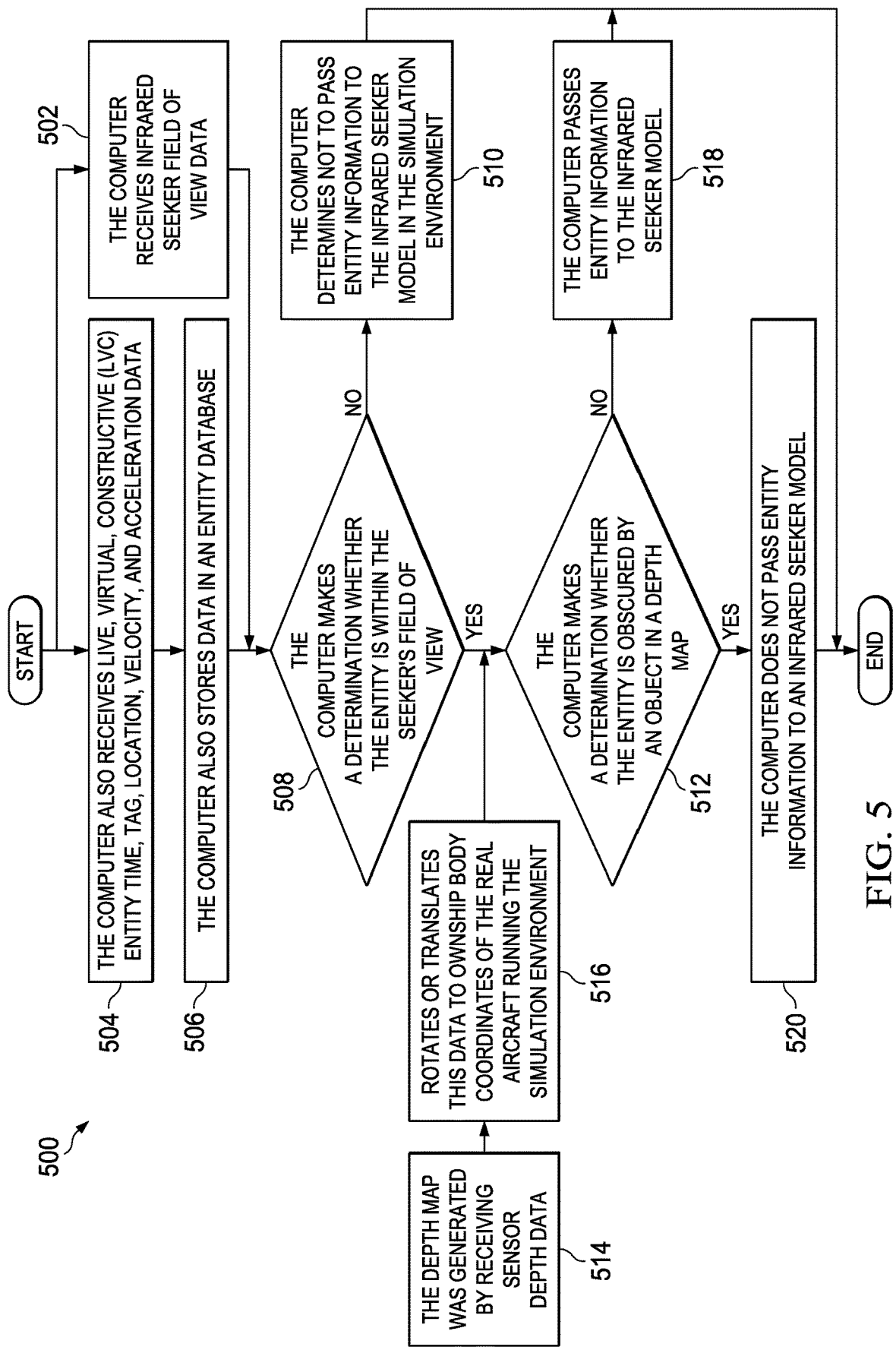
FIG. 5 is an illustration of a method for simulating an obscuration in an air combat training environment in accordance with an illustrative embodiment.

FIG. 5 is an illustration of a method for simulating an obscuration in an air combat training environment in accordance with an illustrative embodiment. Method 500 may be performed using a computer, as described with respect to FIG. 1 through FIG. 4.

Initially, the computer receives infrared seeker field of view data (operation 502). The computer also receives live, virtual, constructive (LVC) entity time, tag, location, velocity, and acceleration data (operation 504). The computer also stores data in an entity database (operation 506).

Next, the computer makes a determination whether the entity is within the seeker's field of view (operation 508). Again, the entity is the target and the seeker is the heat seeking missile. If the entity is not within the seeker's field of view (a "no" answer to operation 508), then the computer determines not to pass entity information to the infrared seeker model in the simulation environment (operation 510). In one illustrative embodiment, the method may terminate thereafter.

However, if the entity is within the seeker's field of view (a "yes" answer to operation 508), then the computer makes a determination whether the entity is obscured by an object in a depth map (operation 512). The depth map was generated by receiving sensor depth data (operation 514) and rotating or translating this data to ownship body coordinates of the real aircraft running the simulation environment (operation 516).

If the entity is not obscured by an object in the depth map (a "no" answer to operation 512), then the computer passes entity information to the infrared seeker model (operation 518). In other words, in the simulated environment, the heat seeking missile can "see" the target. In one illustrative embodiment, the method may terminate thereafter.

However, if the entity is obscured by an object in the depth map (a "yes" answer to operation 512), then the computer does not pass entity information to an infrared seeker model (operation 520). In other words, in the simulated environment, the heat seeking missile cannot "see" the target.

Method 500 may be varied. More or fewer operations may be present. Some of the receipt of data can take place in a different order than that presented, or perhaps simultaneously. Thus, method 500 does not necessarily limit the claimed inventions.

Figure 6:
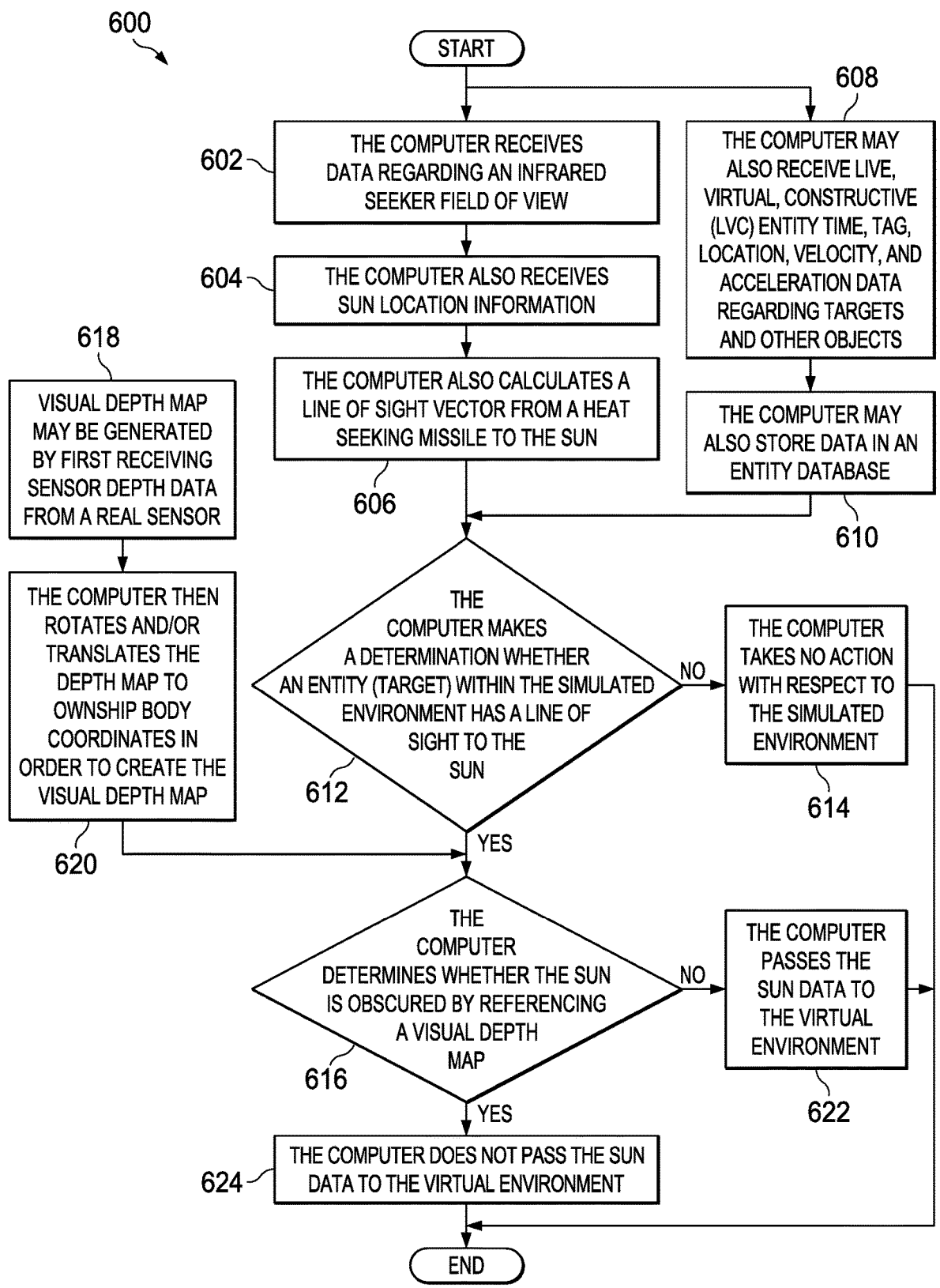
FIG. 6 is an illustration of another method for simulating an obscuration in an air combat training environment in accordance with an illustrative embodiment.

FIG. 6 is an illustration of another method for simulating an obscuration in an air combat training environment in accordance with an illustrative embodiment. Method 600 may be performed using a computer, as described with respect to FIG. 1 through FIG. 4. Method 600 may be a variation of method 500 of FIG. 5.

Method 600 may begin by a computer receiving data regarding an infrared seeker field of view (operation 602). The computer also receives Sun location information (operation 604). The computer also calculates a line of sight vector from a heat seeking missile to the Sun (operation 606). The computer may also receive live, virtual, constructive (LVC) entity time, tag, location, velocity, and acceleration data regarding targets and other objects (operation 608). The computer may also store data in an entity database (operation 610).

With all of the above information, the computer makes a determination whether an entity (target) within the simulated environment has a line of sight to the Sun (operation 612). If there is no line of sight to the Sun (a "no" answer to operation 612), then the computer takes no action with respect to the simulated environment (operation 614). In one illustrative embodiment, the method may terminate thereafter.

If there is a line of sight to the Sun (a "yes" answer to operation 612), then the computer determines whether the Sun is obscured by referencing a visual depth map (operation 616). This visual depth map may be generated by first receiving sensor depth data from a real sensor (operation 618). The computer then rotates and/or translates the depth map to ownship body coordinates in order to create the visual depth map (operation 620).

Returning to the determination in operation 616, if the Sun is not obscured (a "no" determination at operation 616), then the computer passes the Sun data to the virtual environment (operation 622). In this manner, the computer may determine that the Sun interferes with the ability of a heat seeking missile to obtain a lock onto a target. In one illustrative embodiment, the method may terminate thereafter.

Returning to the determination in operation 616, if the Sun is obscured (a "yes" determination at operation 616), then the computer does not pass the Sun data to the virtual environment (operation 624). In this manner, the computer may determine that the Sun does not interfere with the ability of a heat seeking missile to obtain a lock onto a target. In one illustrative embodiment, the method may terminate thereafter.

Method 600 may be varied. More or fewer operations may be present. Some of the receipt of data can take place in a different order than that presented, or perhaps simultaneously. Thus, method 600 does not necessarily limit the claimed inventions.

Figure 7:
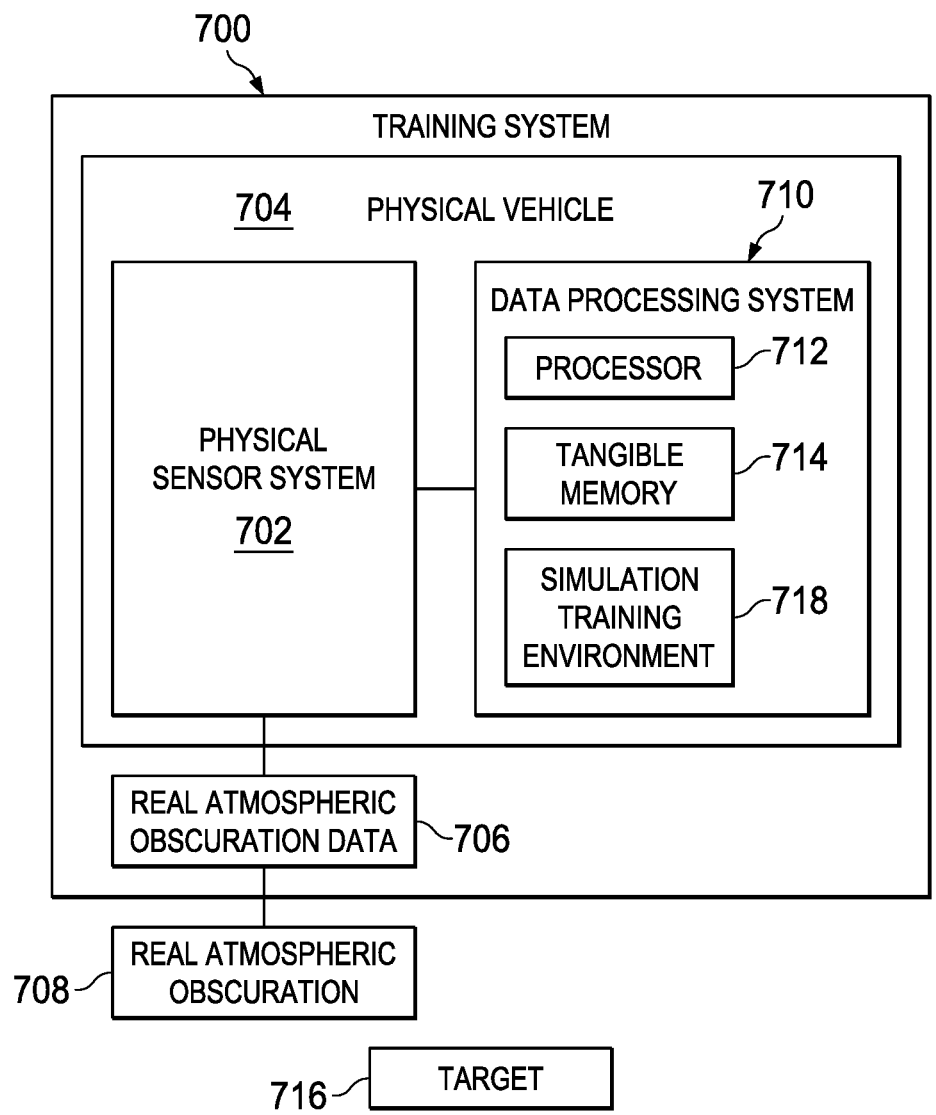
FIG. 7 is an illustration of a block diagram of an air combat training system in accordance with an illustrative embodiment.

FIG. 7 is an illustration of a block diagram of an air combat training system in accordance with an illustrative embodiment. Training system 700 may be a variation of the devices described with respect to FIG. 1 through FIG. 4. Training system 700 may be used to implement method 600 of FIG. 6 or method 500 of FIG. 5.

Training system 700 includes physical sensor system 702 connected to physical vehicle 704. Physical sensor system 702 is configured to obtain real atmospheric obscuration data 706 of real atmospheric obscuration 708. Training system 700 also includes data processing system 710 including processor 712 and tangible memory 714.

Data processing system 710 is configured to receive real atmospheric obscuration data 706, and determine, based on real atmospheric obscuration data 706 whether target 716 is visible to physical vehicle 704 in simulation training environment 718 generated by data processing system 710. Simulation training environment 718 at least includes a virtual representation of physical vehicle 704 and a virtual representation of real atmospheric obscuration 708.

Training system 700 may be varied. For example, in training system 700, physical vehicle 704 may be an aircraft. In this case, physical sensor system 702 may be installed in an externally mounted pod on the aircraft. Physical vehicle 704 may be other types of vehicles, including but not limited to helicopters, automobiles, tanks, or even water vessels and submarines. Physical vehicle 704 could be replaced by a building or other fixed defense installation.

In another variation, data processing system 710 may be further configured to determine whether real atmospheric obscuration 708 is at least one of direct sunlight, a cloud, smoke, or precipitation. In yet another variation, data processing system 710 may be further configured to determine, based on real atmospheric obscuration data 706, if target information about target 716 is passed to simulation training environment 718 for use as ownship information. The determination may be based on a first coordinate location of target 716, a second coordinate location of real atmospheric obscuration 708, and a third coordinate location of the physical vehicle 704.

In still another variation, data processing system 710 may be an on-board computer on physical vehicle 704 or a computer attached to an exterior of physical vehicle 704. In yet another illustrative embodiment, target 716 may be at least one of a real target, a virtual representation of the real target, or a constructive target.

In an illustrative embodiment, physical sensor system 702 may be an infrared camera. Physical sensor system 702 may also be an optical wavelength camera. Physical sensor system 702 may also be a light detection and ranging (LIDAR) system. Physical sensor system 702 may also be both an infrared camera and an optical wavelength camera.

In another illustrative embodiment, training system 700 may also include a wireless communication receiver. The wireless communication receiver may be configured to receive weather information pertinent to a location in which the vehicle is operating, and to provide the weather information to the simulation training environment as part of the real atmospheric obscuration data.

In still another illustrative embodiment, real atmospheric obscuration data 706 may relate to a combination of at least two of a heat source, a cloud, smoke, oil vapor, and precipitation. The heat source may be the Sun.

Training system 700 may be further varied. More or fewer devices, targets, and/or vehicles may be present. Simulation training environment 718 may be varied. Thus, the illustrative embodiments described with respect to FIG. 7 do not necessarily limit the claimed inventions.

Figure 8:
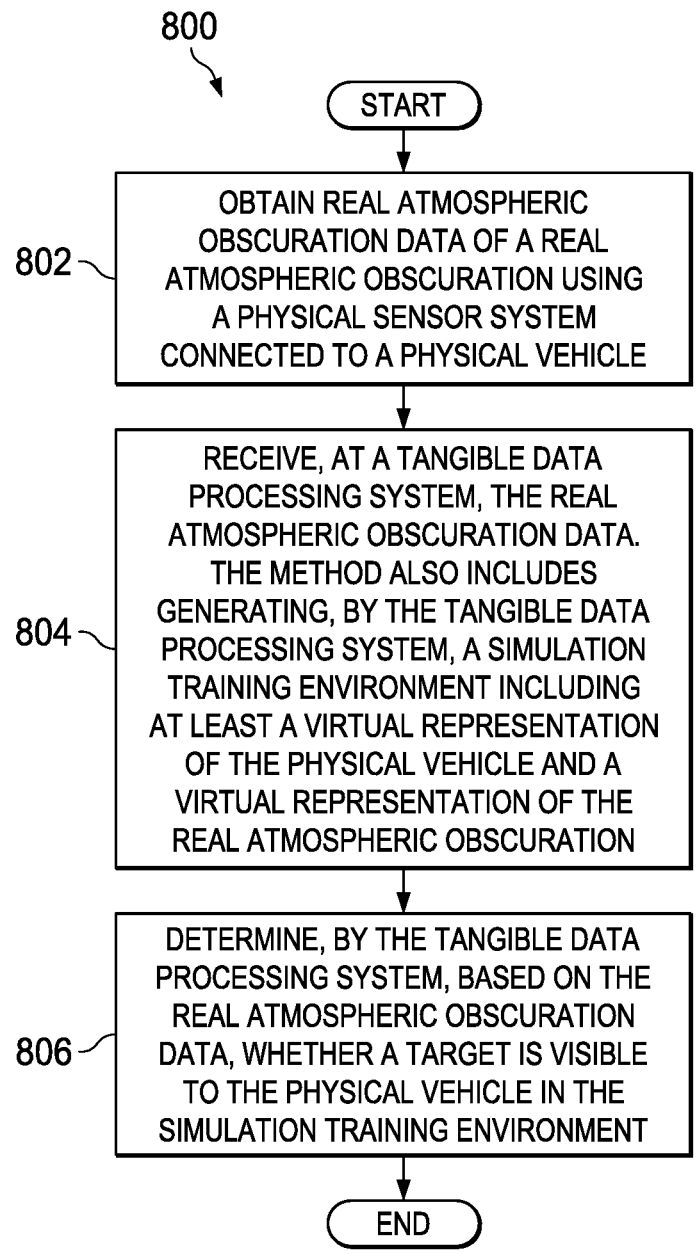
FIG. 8 is an illustration of another method for simulating an obscuration in an air combat training environment in accordance with an illustrative embodiment.

FIG. 8 is an illustration of another method for simulating an obscuration in an air combat training environment in accordance with an illustrative embodiment. Method 800 may be performed using a computer, as described with respect to FIG. 1 through FIG. 4. Method 800 may be performed by training system 700 of FIG. 7. Method 800 may be a variation of method 500 of FIG. 5 or method 600 of FIG. 6. Method 800 may be characterized as a method for training.

Method 800 may include obtaining real atmospheric obscuration data of a real atmospheric obscuration using a physical sensor system connected to a physical vehicle (operation 802). Method 800 also may include receiving, at a tangible data processing system, the real atmospheric obscuration data. The method also includes generating, by the tangible data processing system, a simulation training environment including at least a virtual representation of the physical vehicle and a virtual representation of the real atmospheric obscuration (operation 804).

Method 800 also may include determining, by the tangible data processing system, based on the real atmospheric obscuration data, whether a target is visible to the physical vehicle in the simulation training environment (operation 806). In one illustrative embodiment, the method may terminate thereafter.

Method 800 may be varied. For example, the target may be one of a real target, a virtual representation of the real target, a virtual representation of a manned simulation, and a constructive target. Method 800 may also include additional operations. For example, method 800 may also include, if the target is not visible, tracking the target in the simulation training environment but not displaying the target in the simulation training environment, and if the target is visible, tracking and displaying the target in the simulation training environment.

In another illustrative embodiment, method 800 may also include, if the target is visible, determining whether a solution of the target is degraded by the atmospheric obscuration and degrading the solution of the target in the simulation training environment. In yet another illustrative embodiment, method 800 may also include receiving, by the tangible data processing system, weather information pertinent to a location in which the vehicle is operating and providing the weather information to the simulation training environment as part of the real atmospheric obscuration data.

Method 800 may be further varied. More or fewer operations may be present. Some of the receipt of data can take place in a different order than that presented, or perhaps simultaneously. Thus, method 800 does not necessarily limit the claimed inventions.

Figure 9:
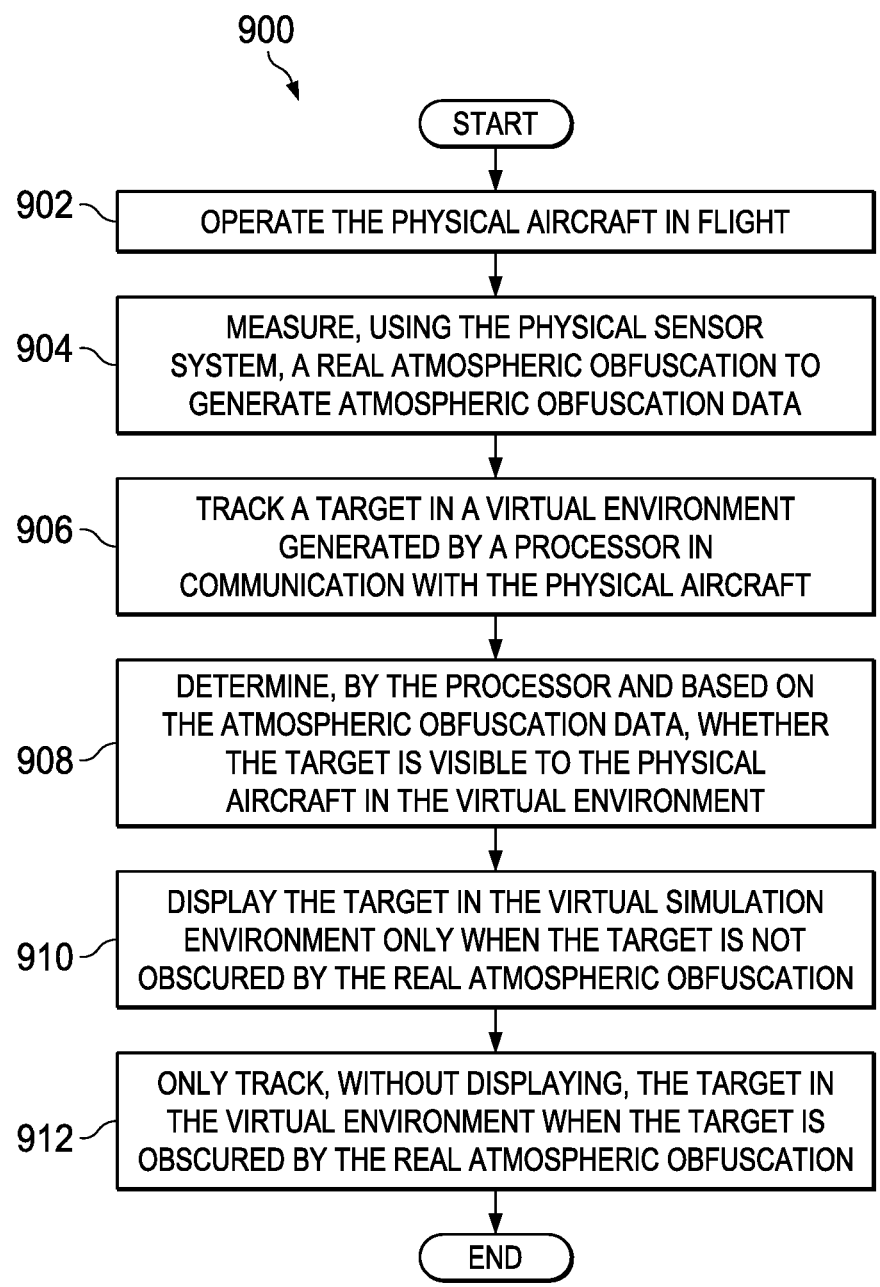
FIG. 9 is an illustration of another method for simulating an obscuration in an air combat training environment in accordance with an illustrative embodiment.

FIG. 9 is an illustration of another method for simulating an obscuration in an air combat training environment in accordance with an illustrative embodiment. Method 900 may be performed using a computer, as described with respect to FIG. 1 through FIG. 4. Method 900 may be performed by training system 700 of FIG. 7. Method 800 may be a variation of method 500 of FIG. 5, method 600 of FIG. 6, or method 800 of FIG. 8. Method 900 may be characterized as a method of simulating targets for a physical aircraft configured with a physical sensor system.

Method 900 may include operating the physical aircraft in flight (operation 902). Method 900 also may include measuring, using the physical sensor system, a real atmospheric obscuration to generate atmospheric obscuration data (operation 904).

Method 900 also may include tracking a target in a virtual environment generated by a processor in communication with the physical aircraft (operation 906). Method 900 may also include determining, by the processor and based on the atmospheric obscuration data, whether the target is visible to the physical aircraft in the virtual environment (operation 908).

Method 900 also may include displaying the target in the virtual simulation environment only when the target is not obscured by the real atmospheric obscuration (operation 910). The method also may include only tracking, without displaying, the target in the virtual environment when the target is obscured by the real atmospheric obscuration (operation 912). In one illustrative embodiment, the method may terminate thereafter.

Method 900 may be varied. For example, method 900 may also include determining, taking into account the atmospheric obscuration data, whether a missile connected to the aircraft has a firing solution on the target. Method 900 may also include simulating launch of the missile if the aircraft has the firing solution.

Method 900 may be further varied. More or fewer operations may be present. Some of the receipt of data can take place in a different order than that presented, or perhaps simultaneously. Thus, method 900 does not necessarily limit the claimed inventions.

Figure 10:
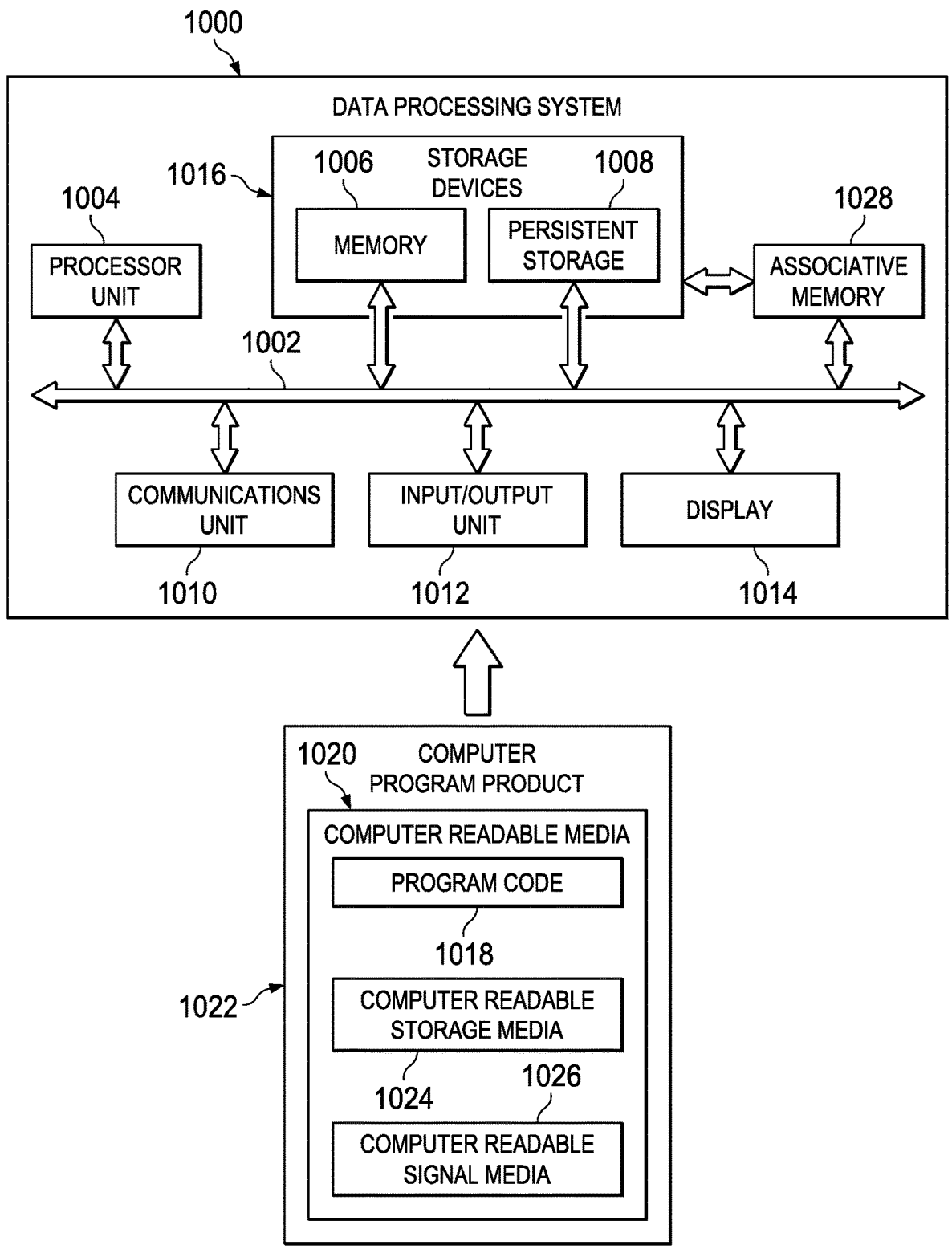
FIG. 10 is an illustration of a data processing system in accordance with an illustrative embodiment.

Turning now to FIG. 10, an illustration of a data processing system is depicted in accordance with an illustrative embodiment. Data processing system 1000 in FIG. 10 is an example of a data processing system that may be used to in conjunction with the illustrative embodiments, such as training system 700 of FIG. 7, or any other device or technique disclosed herein. In this illustrative example, data processing system 1000 includes communications fabric 1002, which provides communications between processor unit 1004, memory 1006, persistent storage 1008, communications unit 1010, input/output unit 1012, and display 1014.

Processor unit 1004 serves to execute instructions for software that may be loaded into memory 1006. This software may be an associative memory, which is a type of content addressable memory, or software for implementing the processes described herein. Thus, for example, software loaded into memory 1006 may be software for executing method 800 of FIG. 8, or for executing techniques described with respect to FIG. 1 through FIG. 7.

Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information, either on a temporary basis and/or a permanent basis. Storage devices 1016 may also be referred to as computer-readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory drive, a rewritable optical disk, a rewritable magnetic tape, or some combination of the above mentioned devices. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either physical or wireless communications links, or both.

Input/output unit 1012 allows for input and output of data with other devices that may be connected to data processing system 1000. For example, input/output unit 1012 may provide a connection for user input through a keyboard, a mouse, and/or some other suitable type of input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer-useable program code, or computer-readable program code that may be read and executed by a processor in processor unit 1004. The program code in the different embodiments may be embodied on different physical or computer-readable storage media, such as memory 1006 or persistent storage 1008.

Computer-usable program code 1018 is located in a functional form on computer-readable media 1020 that is selectively removable and may be loaded onto or transferred to data processing system 1000 for execution by processor unit 1004. Computer-usable program code 1018 and computer-readable media 1020 form computer program product 1022 in these examples. In one example, computer-readable media 1020 may be computer-readable storage media 1024 or computer-readable signal media 1026. Computer-readable storage media 1024 may include, for example, an optical or magnetic disk that is inserted or placed into a drive or other device that is part of persistent storage 1008 for transfer onto a storage device, such as a hard drive, that is part of persistent storage 1008. Computer-readable storage media 1024 also may take the form of a persistent storage, such as a hard drive, a thumb drive, or a flash memory, that is connected to data processing system 1000. In some instances, computer-readable storage media 1024 may not be removable from data processing system 1000.

Alternatively, computer-usable program code 1018 may be transferred to data processing system 1000 using computer-readable signal media 1026. Computer-readable signal media 1026 may be, for example, a propagated data signal containing computer-usable program code 1018. For example, computer-readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, computer-usable program code 1018 may be downloaded over a network to persistent storage 1008 from another device or data processing system through computer-readable signal media 1026 for use within data processing system 1000. For instance, program code stored in a computer-readable storage medium in a server data processing system may be downloaded over a network from the server to data processing system 1000. The data processing system providing computer-usable program code 1018 may be a server computer, a client computer, or some other device capable of storing and transmitting computer-usable program code 1018.

The different components illustrated for data processing system 1000 are not meant to provide architectural limitations to the manner in which different embodiments may be implemented. The different illustrative embodiments may be implemented in a data processing system including components, in addition to or in place of those, illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components, excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, or other suitable types of hardware devices. With this type of implementation, computer-usable program code 1018 may be omitted because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run computer-usable program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer-readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, a cache. A memory may also be memory 1006, found in an interface and memory controller hub that may be present in communications fabric 1002.

Data processing system 1000 may also include an associative memory. An associative memory may be in communication with communications fabric 1002. An associative memory may also be in communication with, or in some illustrative embodiments, be considered part of storage devices 1016. Additional associative memories may be present.

As used herein, the term "associative memory" refers to a plurality of data and a plurality of associations among the plurality of data. The plurality of data and the plurality of associations may be stored in a non-transitory computer-readable storage medium. The plurality of data may be collected into associated groups. The associative memory may be configured to be queried based on at least indirect relationships among the plurality of data, in addition to direct correlations among the plurality of data. Thus, an associative memory may be configured to be queried based solely on direct relationships, based solely on at least indirect relationships, as well as based on combinations of direct and indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and indirect relationships, or from among the plurality of data, in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which include but are not limited to forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk read-only memory (CD-ROM), compact disk read/write (CD-R/W), or DVD.

Further, a computer-usable or computer-readable medium may contain or store a computer-readable or computer-usable program code, such that when the computer-readable or computer-usable program code is executed on a computer, the execution of this computer-readable or computer-usable program code causes the computer to transmit another computer-readable or computer-usable program code over a communications link. This communications link may use a medium that is, for example without limitation, physical or wireless.

A data processing system suitable for storing and/or executing computer-readable or computer-usable program code will include one or more processors coupled, directly or indirectly, to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output unit or input/output devices can be coupled to the system either directly or through intervening input/output controllers. These devices may include, for example, without limitation, keyboards, touch screen displays, or pointing devices. Different communications adapters may also be coupled to the system to enable the data processing system to become coupled to other data processing systems, remote printers, or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A training system configured to integrate a real atmospheric obscuration into heat seeking missile targeting in a live, virtual, constructive training system, such that the live, virtual, constructive training system comprises:
    a sensor system that comprises a depth sensing visual sensor connected to a physical vehicle and configured to obtain real atmospheric obscuration data of the real atmospheric obscuration and provide the real atmospheric obscuration data to an obscuration function in a data processing system that comprises a processor and a tangible memory configured to:
    simulate an existence of a heat seeking missile, on the physical vehicle, with a seeker model;
    receive the real atmospheric obscuration data;
    convert the real atmospheric obscuration data into a depth map based upon a rotation and a translation of the real atmospheric obscuration data to ownship body coordinates of the physical vehicle that characterizes a representation of the real atmospheric obscuration in a simulation training environment generated by the data processing system;
    determine, based on the depth map, if the representation of the real atmospheric obscuration obscures a firing solution by the heat seeking missile simulated by the seeker model from the physical vehicle to a virtual target in the simulation training environment, such that the virtual target is a representation generated from a human-controlled simulator; and
    responsive to an obscured firing solution, withhold data about the virtual target from the seeker model and deny the firing solution on the virtual target by the heat seeking missile, on the physical vehicle, simulated by the seeker model.

2. The training system of claim 1, wherein the physical vehicle comprises an aircraft.

3. The training system of claim 1, wherein the data processing system is further configured to determine whether the real atmospheric obscuration comprises at least one of direct sunlight, a cloud, smoke, or precipitation.

4. The training system of claim 1, wherein the data processing system is further configured to, based on the real obscuration atmospheric data, pass target information about the virtual target to the simulation training environment for use as ownship information, wherein a determination is based on a first coordinate location of the virtual target, a second coordinate location of the real atmospheric obscuration, and a third coordinate location of the physical vehicle.

5. The training system of claim 1, wherein the data processing system is an on-board computer on the physical vehicle or is a computer attached to an exterior of the physical vehicle.

6. The training system of claim 1, further comprising at least one of: a real target, or a constructive target.

7. The training system of claim 1, wherein the sensor system comprises an infrared camera.

8. The training system of claim 1, wherein the sensor system comprises an optical wavelength camera.

9. The training system of claim 1, wherein the sensor system comprises a light detection and ranging (LIDAR) system.

10. The training system of claim 1, wherein the sensor system comprises both of an infrared camera and an optical wavelength camera.

11. The training system of claim 1 further comprising:
a wireless communication receiver configured to receive weather information pertinent to a location in which the physical vehicle is operating, and to provide the weather information to the simulation training environment as part of the real atmospheric obscuration data.

12. The training system of claim 1, wherein the real atmospheric obscuration data comprises a combination of at least two of: a heat source, a cloud, smoke, oil vapor, and precipitation.

13. The training system of claim 1, wherein the real atmospheric obscuration data comprises a combination of direct sunlight and one of: a cloud, smoke, oil vapor, and precipitation.

14. A method of determining a firing solution for a seeker model simulating an existence of a heat seeking air-to-air missile on a physical vehicle in a live, virtual, constructive training system, the method comprising:
obtaining real atmospheric obscuration data of a real atmospheric obscuration using a physical sensor system comprising a depth sensing visual sensor connected to the physical vehicle;
a tangible data processing system in the live, virtual constructive training system performing the following:
receiving the real atmospheric obscuration data;
generating, by the tangible data processing system, a simulation training environment in the live, virtual, constructive system including at least a representation of the physical vehicle;
converting the real atmospheric obscuration data into a depth map by rotating and translating the real atmospheric obscuration data to ownship body coordinates of the physical vehicle and forming, using an obscuration function, a representation of the real atmospheric obscuration in the simulation training environment;
determining, using the obscuration function using and the depth map if the representation of the real atmospheric obscuration obscures a firing solution by the seeker model simulating the heat seeking air-to-air missile from the physical vehicle to a virtual target in the simulation training environment, such that the virtual target is a representation generated from a human-controlled simulator; and
withholding, responsive to an obscured firing solution, data about the virtual target from the seeker model and denying the firing solution to the virtual target by the heat seeking missile, on the physical vehicle, simulated by the seeker model.

15. The method of claim 14, further comprising one of: a real target, and a constructive target.

16. The method of claim 14, further comprising:
responsive to a line of sight from the physical vehicle for the seeker model to the virtual target being obscured, tracking the virtual target in the simulation training environment but not displaying the virtual target in the simulation training environment; and
responsive to the line of sight from the physical vehicle for the seeker model to the virtual target being visible, tracking and displaying the virtual target in the simulation training environment.

17. The method of claim 14 further comprising:
using a visibility of the virtual target along line of sight from the seeker model to the virtual target, the tangible data processing system determining a degradation by the real atmospheric obscuration to the solution to the virtual target; and
applying the degradation to the solution of the virtual target in the simulation training environment.

18. The method of claim 14 further comprising:
receiving, by the tangible data processing system, weather information pertinent to a location in which the physical vehicle is operating; and
providing the weather information to the simulation training environment as part of the real atmospheric obscuration data.

19. A method of simulating a heat seeking air-to-air missile target tracking for a physical aircraft configured with a physical sensor system, the method comprising:
operating the physical aircraft in flight in a live, virtual, constructive training system comprising a tangible processor;
measuring, using the physical sensor system comprising a depth sensing visual sensor, a real atmospheric obscuration and generating atmospheric obscuration data representing the real atmospheric obscuration within the live, virtual, constructive training system;
converting the atmospheric obscuration data representing the real atmospheric obscuration into a depth map by rotating and translating atmospheric obscuration data representing the real atmospheric obscuration to ownship body coordinates of the physical aircraft and forming, using an obscuration function in the tangible processor, a representation of the real atmospheric obscuration in a simulation training environment;
determining, by the tangible processor using: the atmospheric obscuration data, the depth map, and the obscuration function, if the representation of the real atmospheric obscuration obscures a firing solution by a seeker model simulating an existence of the heat seeking air-to-air missile from the physical aircraft to a virtual target in the live, virtual, constructive training system, such that the virtual target is a representation generated from a human-controlled simulator; and
withholding, responsive to an obscured firing solution, data about the virtual target from the seeker model and denying the firing solution to the virtual target by the heat seeking missile, on the physical aircraft, simulated by the seeker model.

20. The method of claim 19 further comprising:
determining if the firing solution by the seeker model is unobscured by the representation of the atmospheric obscuration data representing the real atmospheric obscuration, whether simulating the existence of the heat seeking air-to-air missile connected to the physical aircraft to the virtual target; and
passing, responsive to the firing solution to the virtual target being unobscured, data about the virtual target to the seeker model, and simulating launching, from the physical aircraft, the heat seeking air-to-air missile connected to the physical aircraft simulated by the seeker model to the virtual target.

* * * * *